United States Patent
Reich et al.

[11] Patent Number: 6,151,385
[45] Date of Patent: Nov. 21, 2000

[54] SYSTEM FOR THE AUTOMATIC NOTIFICATION THAT A 9-1-1 CALL HAS OCCURRED

[75] Inventors: Don E. Reich, Westlake Village; Angelo Salvucci, Santa Barbara; Kurt E. Warner, Carpenteria; William C. Cook, Van Nuys, all of Calif.

[73] Assignee: 911 Notify.com, L.L.C., Santa Barbara, Calif.

[21] Appl. No.: 09/467,641

[22] Filed: Dec. 20, 1999

Related U.S. Application Data

[63] Continuation-in-part of application No. 09/256,152, Nov. 25, 1998, abandoned.
[60] Provisional application No. 60/091,883, Jul. 7, 1998.

[51] Int. Cl.⁷ .................................................. H04M 11/04
[52] U.S. Cl. .................................. 379/49; 379/45; 379/48
[58] Field of Search ................................ 379/37–51, 201, 379/211

[56] References Cited

U.S. PATENT DOCUMENTS

| | | | |
|---|---|---|---|
| 5,195,126 | 3/1993 | Carrier et al. | 379/45 |
| 5,805,670 | 9/1998 | Pons et al. | 379/45 |

FOREIGN PATENT DOCUMENTS

| | | | |
|---|---|---|---|
| 3826243 | 8/1989 | Germany | 379/45 |

*Primary Examiner*—Wing F. Chan
*Attorney, Agent, or Firm*—Owen L. Lamb

[57] ABSTRACT

A system for calling designated addressable notify devices in response to a query to a local telephone company's ALI database system. An advertisement of the 9-1-1-call notification service directs the new subscriber to contact their local telephone provider to register with the new service. The local telephone provider supplies the new system with the registered subscriber's telephone number (ANI) and password. The new subscriber them calls the new service provider directly to register their addressable communication devices to be notified pending a positive reaction to an ALI database system query and the service providers subscriber database. When a registration call is received from a new subscriber, the software proceeds with a voice answerback menu to register numbers to be notified. The notify numbers are stored in a list in a database memory maintained by the notify service. If a call is received from a current subscriber, the software proceeds with a voice answerback menu to update the previously registered numbers to be notified. Subsequently, if a 9-1-1 call is placed from a station that has previously been registered with the service which initiates an ALI database query, the software automatically places a call to each addressable notify device on the subscriber's notify list. If an answer is confirmed, the software transmits a notify message over the telephone or wireless line. The message at least identifies the subscriber's telephone number, and the time and date of the call. If an answer is not confirmed, or the line is busy, the software turns on a "call later" tag associated with the notify number corresponding to the unconfirmed or uncompleted call. Periodically, the software services any tagged, unconfirmed notify calls.

22 Claims, 6 Drawing Sheets

| SUBSCRIBER NUMBER | ACCOUNT STATUS | NOTIFY NUMBER | INTERNET ADDRESS | INFORMATION LINE NUMBER | LANGUAGE | CALL LATER TAG | SECURITY CODE |
|---|---|---|---|---|---|---|---|
| (XXX) XXX XXXX | x | (XXX) XXX XXXX | XXXXXXXXXX | XXXXXXXXXX | XXX | X | XXX |
| (XXX) XXX XXXX | x | (XXX) XXX XXXX | XXXXXXXXXX | XXXXXXXXXX | XXX | X | XXX |
| (XXX) XXX XXXX | x | (XXX) XXX XXXX | XXXXXXXXXX | XXXXXXXXXX | XXX | X | XXX |
| (XXX) XXX XXXX | x | (XXX) XXX XXXX | XXXXXXXXXX | XXXXXXXXXX | XXX | X | XXX |

FIG. 6

SYSTEM FOR THE AUTOMATIC NOTIFICATION THAT A 9-1-1 CALL HAS OCCURRED

CROSS-REFERENCE TO RELATED APPLICATIONS

This application is a continuation-in-part of application Ser. No. 09/256,152 filed Nov. 25, 1998, now abandoned, of Don E. Reich, et al. titled "System For The Automatic Notification That A 9-1-1 Call Has Occurred" which is a continuation-in-part of provisional application Ser. No. 60/091,883 filed Jul. 7, 1998, of Don E. Reich, et al. which applications are incorporated herein by reference.

BACKGROUND OF THE INVENTION

1. Field of the Invention

This invention relates to telecommunication networks and more particularly, to an automated notification feature which responds whenever a query is made to an Automatic Location Identification (ALI) database by placing a outbound notification call to a list of predetermined telephone numbers.

2. Description of the Prior Art

Nationwide, a non-toll telephone number 9-1-1 has been designated for calls relating to emergencies that threaten human life or property. The calls are directed by the telephone company's End Office/Central Office (CO) and 9-1-1 Tandem to a Public Safety Answering Point (PSAP) where the calling number Automatic Number Identification (ANI) is displayed on a viewing screen. Most areas now have "Enhanced 9-1-1" which allows selective routing and through which both the calling number and address of the caller are displayed on a viewing screen at the PSAP, thus enabling the emergency agency to locate the caller if the call is interrupted. The address of the caller is obtained from the telephone company's customer records Automatic Location Identification (ALI) database system. Personnel at the PSAP talk to the caller and route the call to the appropriate agency equipped to handle the emergency, such as ambulance; fire and rescue; police, sheriff and highway patrol; or Coast Guard, Search and Rescue. The call may be routed through several CO's and/or to several destinations.

Third parties, other than the agency responding to the emergency, may also be notified that a 9-1-1- call has been received. Prior approaches to call notification and/or routing are represented by the following prior art patents:

Carrier, et. Al., U.S. Pat. No. 5,195,126, granted Mar. 16, 1993, for "Emergency Alert and Security Apparatus and Method" discloses a telecommunications system which includes a 9-1-1 and voice message service platform for providing such services as telephone answering, voice mail and call completion. An emergency/safety notification system is incorporated and includes a monitor/router device passively connected to the 9-1-1 Tandem to detect number identification signals. In the event of a 9-1-1 telephone call, the service initiates a voice mail call, which plays a custom message from the calling party to designated third parties. The Carrier patent does not provide for the automatic insertion of the calling party's ANI, the date or the time of the 9-1-1 call, or the name or location or address of the telephone customer. The service is driven from a passive monitor/router at every 9-1-1 Tandem. The service provides only voice mail in the event of a 9-1-1 call. If no voice mail message is provided by the subscriber, no message is played in the event of a 9-1-1 call.

It is desirable to provide a system for 9-1-1 call notification that does not require a passive monitor/router at every 9-1-1 Tandem. It is also desirable to provide a system for 9-1-1 call notification that does not rely on providing a voice mail service, but provides accurate notification, not messaging.

Pons, et. Al., U.S. Pat. No. 5,805,670, granted Sep. 8, 1998, for "Private Notification System for Communicating 9-1-1 Information" discloses an advanced personal safety service that is connected directly to 9-1-1 call centers. To activate the service, subscribers complete a questionnaire providing personal information about their location and household and pay a monthly fee. When a subscriber dials 9-1-1 for help and the call is answered, their data is routed from a database at the PSAP to the 9-1-1-call taker/dispatcher. Personnel at the PSAP notify designated emergency contacts that a 9-1-1 call has been placed from the subscriber's location. Police, fire and emergency medical services are provided with critical personal information about subscribers, such as medical history and pre-existing conditions, as well as the location of children, elderly or infirm persons within a dwelling. Thus, the service provides emergency services with critical personal information about subscribers and prompts said emergency service personnel to notify designated third parties that 9-1-1 was dialed.

It is desirable to provide a system for 9-1-1 call notification that does not rely on human intervention to place a notification call but does provide for the immediate, automatic calling of telephone numbers to notify parties that an emergency call was initiated. In catastrophic situations such as natural or manmade disasters, PSAP personnel could be overwhelmed by the number of calls and placing notify calls could be delayed for considerable periods of time or quite possibly abandoned entirely.

It is desirable to provide a 9-1-1-call notification service for new and existing telephone equipment that automatically notifies third parties that a 9-1-1 call was made from the subscriber's telephone at a specific date and time at which an ALI database system query was initiated.

It is desirable to provide a system wherein a telephone customer can subscribe to a service in which said customer (hereinafter "subscriber") can directly and personally register a phone number(s) to be automatically notified in the event a 9-1-1 call is initiated to a Public Safety Answering Point (PSAP), originating from the subscriber's telephone at a specific date and time.

It is desirable to provide said system such that a subscriber can easily reassign numbers to be notified without the necessity of additional human intervention.

It is desirable to provide a 9-1-1 call notification feature on existing telephone lines that automatically notifies third parties that a 9-1-1 call, originating at the subscribers telephone, was placed to a Public Safety Answering Point (PSAP), without the need for human intervention.

It is desirable to provide said system based on a query to a telephone company's ALI database system to thereby reduce system complexity by having fewer points of connection, and allow additional information, such as the subscriber's name and location and/or address, to be obtained and included in the notification.

It is desirable to provide a system that will detect and respond to a call to an emergency service that is compatible with call diversion systems, operator handled calls and private branch exchange (PBX) systems.

SUMMARY OF THE INVENTION

Description of the Invention

The invention is a computer driven telecommunications system that automatically reacts to all emergency 9-1-1 calls that result in a query to the local telephone company's Automatic Location Identification (ALI) system. This query may come from a tandem selective router, a 9-1-1 controller, a signal control point, or other source of an Automatic Number Identification (ANI). Reaction is based on the Automatic Number Identification (ANI) as provided to the new system by the local telephone company through a connection from the ALI database. Reaction to said input includes evaluation of all ANI's to determine if said ANI is for a customer that has subscribed to the system and, pending positive evaluation, reacting through existing telephone networks by notifying addressable communication devices that a 9-1-1 call has been placed from said subscriber's telephone.

There are three main components to the system: Registration, Data Acquisition and Notification.

Registration may be through the local telephone company, or directly to the new system, or a combination of both. During the registration mode, a telephone customer registers their telephone number and telephone number(s) to be notified upon the occurrence of 9-1-1 call originating at the subscriber's telephone. The cost of the service appears on the subscriber's telephone bill or by direct mailing by the notify service. Thus, only those telephone customers that have subscribed to the service will have information transmitted to designated notify telephone numbers. Registration via the local telephone company requires scheduled downloading of a data packets for each registrant to the system's master subscriber database.

Data acquisition comprises reception of all ANIs used to retrieve information from a local telephone company's ALI database system. All ANIs that are used to query the ALI database system are evaluated against the master subscriber data base to verify account status and if positive evaluation is confirmed, notification commences relative to that particular ANI.

Notification is comprised of placing an outgoing connection to each subscriber's list of addressable communication devices to be notified under the terms of the system and placing either a computer generated voice or text message on said connection, informing said communication device that said subscriber has initiated a 9-1-1 call.

Other components of the system include typical computer generated options such as modification of addressable communication devices to be automatically connected, automatic testing of the notification process by the subscriber, help notifications and pricing information responses.

The invention has the advantage that it enables the rapid notification of third parties that a 9-1-1 call has occurred without human intervention using one point of connection, the ALI database. Telephone companies typically have primary and secondary ALI database locations. The system herein is designed to mirror this redundancy by connecting to all ALIs operated by a telephone company for a given geographic location in which the invention is implemented.

One example would be an elderly individual, who could have their child, neighbor and/or friend automatically notified via numerous communication devices if the elderly individual had a medical emergency and placed a call to 9-1-1 and which a Public Safety Answering Point (PSAP) in responding initiated a query to the telephone company's ALI database. This would allow the child, neighbor and/or friend to have an early warning that an emergency had occurred.

An important advantage of the present invention is that designated parties are notified that a 9-1-1 call has been placed, even though it may not have been answered or responded to. This is a very useful and unique feature because even when personnel are too busy to answer a 9-1-1 call a notified party is informed that the call was placed.

BRIEF DESCRIPTION OF THE DRAWINGS

The invention will be described in greater detail with reference to the drawings in which.

DETAILED DESCRIPTION OF THE INVENTION

Overview of the Invention

The invention pertains to an automatic system for notifying designated communication devices that a 9-1-1 call has been placed. Advertisement of the 9-1-1-call notification service directs the future subscriber to call their local telephone provider to sign up for the service. During sign-up, the local telephone company may either obtain the addressable communication devices to be notified and supply the new subscriber a password for accessing the system's Interactive Voice Response (IVR) for future editing of said addresses or provide the new subscriber with only a password to access the systems IVR directly, thus allowing said new subscriber to input the notify addresses directly. In either event, the telephone company provides a download of the subscriber's ANI and the associated notify numbers and/or the provided password to the new system's main subscriber database by means of data packets periodically scheduled for downloading.

Access to the system's IVR is established via a voice telephony connection (toll free 800 or other) and/or an Internet address Web page. When a voice telephony call is received from a subscriber and the password is confirmed, the software proceeds with a voice answer-back menu allowing the subscriber to register new notify device addresses, edit/change existing notify device addresses, test the system without calling 9-1-1, etc. Subscribers sign up over the Internet by accessing the system's Internet Web page directly. Similar options offered through the IVR system are offered via the Internet- addressed on-line menu.

Subsequently, if a 9-1-1 call is placed from a station that has previously been registered with the service, the software automatically notifies each device on the subscriber's notify list. If a telephone or other two-way communication device answer is confirmed, the software transmits the notify information to the device. The information at least identifies the calling phone number, and the time and date of the call. If an answer is not confirmed, or the line is busy, the software turns on a "call later" tag associated with the notify number corresponding to the unconfirmed or uncompleted call. Periodically, the software services any tagged unconfirmed notify calls. For Internet or other one-way text or other devices, the notify information is sent.

The following details the preferred method for the implementation of the invention. It shall be understood by those familiar with the telecommunications field that actual implementation shall be predicated on the state of the relevant telephony/communication technology at the time of implementation of the current invention and the level of involvement of the network telephony/communication service provider in the implementation of the current invention.

DETAILED DESCRIPTION OF THE INVENTION

Figure 1:
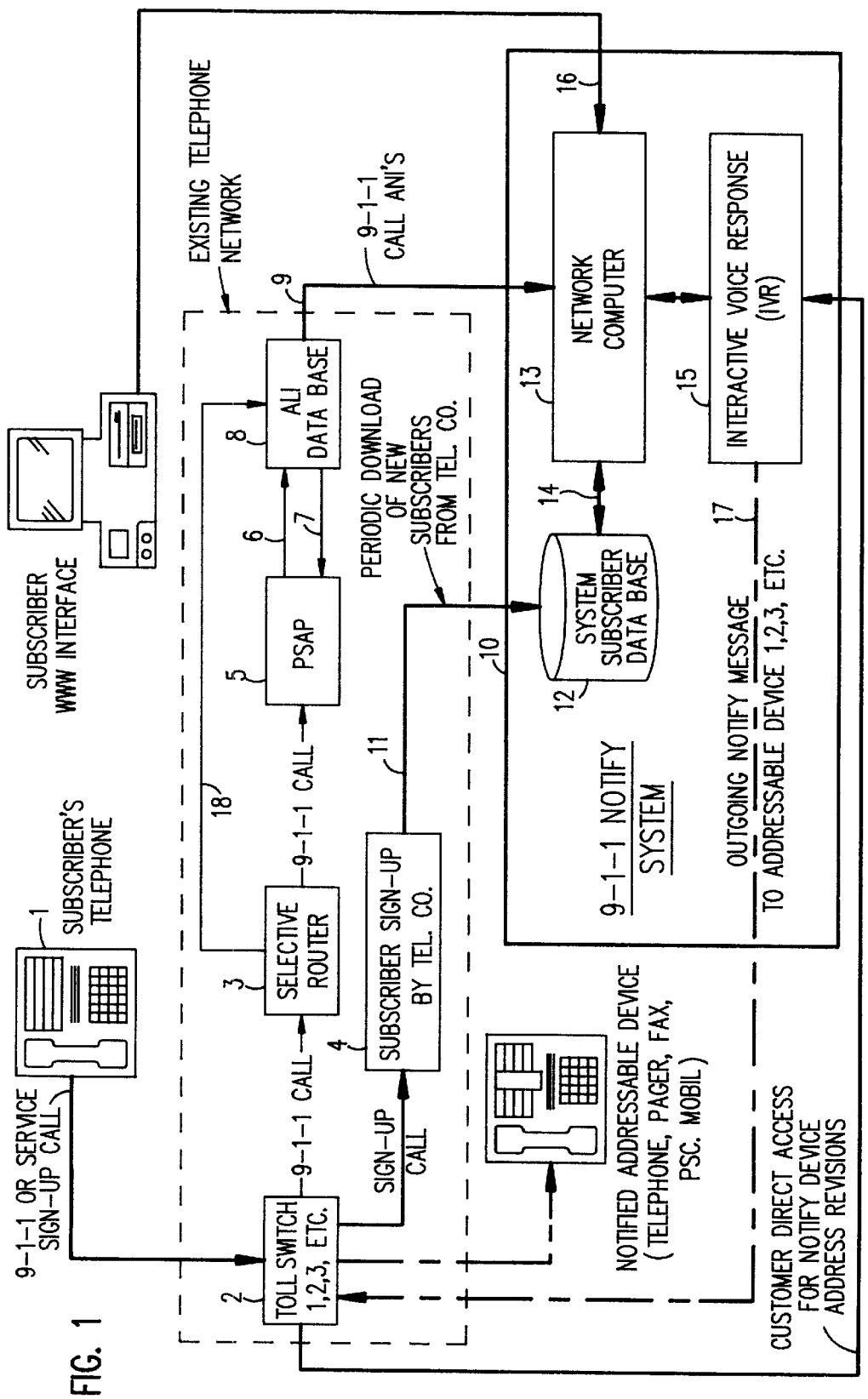
FIG. 1 is a block diagram of an existing inter-exchange network that provides 9-1-1 call services in which the present invention is embodied by receiving data from the local telephone company's ALI data base, receiving data from a local telephone company's order taking system; allowing subscriber's to access the system and transmitting notification in the event of trigger.

Refer to FIG. 1 in which an existing telephone network is shown. A typical network includes a number of interconnected toll switches and other telecommunication devices. Each toll switch may be any one of well-known types of switching equipment, such as, for example, the No. 4 ESS (Electronic Switching System) of AT&T. In a typical case, a toll switch is associated with a local Central Office (not depicted), which may include any number of toll switches. The Central Office (CO) connects a calling station (1) that has dialed a particular telephone number to an associated toll switch (2). In doing so, the CO sends to the toll switch calling information including the dialed (called) telephone number and telephone number of the calling station. A CO will also advance a telephone call received from its associated toll switch to an intended telephone station associated with that CO.

A subscriber (1) to the new service shall contact their local telephone provider (4) with the intent of registering for the service. The local telephone provider shall register the new subscriber and provide said subscriber with a security code password for accessing the new system (either by telephone or Internet). This is accomplished by an existing process.

The local telephone provider shall supply the new system (10) with "data packets" at regular intervals via modem or Internet connection (11). Each data packet shall include the ANI of the new subscriber, the password assigned to said new subscriber and accounting protocols as required. The data packets shall be disseminated and organized by the new system into the System Subscriber Database (12). The method of transferring data packets exists.

Once the data packets are received and organized by the new system, the new subscriber may access the system with the previously mentioned password via direct telephony IVR (15) or Internet access (16). Once accessed to the new system, the new subscriber shall have the option of defining the addressable telephony communication devices (telephone, pager, PCS, email, fax, etc.), editing/deleting addressable devices, testing the system, etc.

When a 9-1-1 call is placed from a subscriber's telephone (1), the CO for the calling station routes the 9-1-1 call through any number of toll switches (2) to a 9-1-1 tandem selective router (3) which ascertains to which PSAP (5) the call should be routed. The call may go directly to the selective router from toll switch #1 or may be required to go through any number of toll switches (hence CO's) depending on the location of the calling station. The exact routing of the 9-1-1 call to the selective router is by an existing process. The 9-1-1 tandem selective router (3) may query the providing telephone company's Automatic Location Identification (ALI) system (8).

At the PSAP, the call is received by a local controller module and routed to the next available answering station. Simultaneously, if ALI information is not received from the 9-1-1 tandem, the local controller module in the PSAP initiates a query (6) to the providing telephone company's ALI system (8). The query, based on the original calling station's ANI, retrieves the address of the original calling station from the ALI database system. Said address is routed back (7) to the PSAP and displayed on a monitor screen at the answering station.

The response of the new notify system is triggered from the ALI database system query. The query may come from the 9-1-1 tandem or from the local controller module in the PSAP. In either case, the ALI database system software transmits, in response to the ANI query, all of the ANIs querying said ALI system, and other information, to the new system via dedicated telephony line (9). The incoming information packets from the ALI database system shall include at least the time and date of the query and the ANI used to initiate said query. Other information may be transmitted as well such as the name and address of the subscriber, the physical location of the subscriber if that information is available (such as from a global positioning system) and the number of an information line associated with the Public Safety Answering Point (PSAP) servicing the subscriber's telephone number.

All incoming ANI's (9) querying the ALI database system are compared to the new system's "System Subscriber Database" (12). Reaction to negative matches results in "routing to ground" (i.e., deletion) of the particular ANI to which no match was found. Positive reaction (i.e., incoming ANI matched to existing ANI in the new system's "System Subscriber Database") results in the system accessing the matched subscriber's registration data record using a translation of the calling ANI as an index to a table. The new system then initiates the notification mode.

In the notification mode, the new system contacts each addressable communication device identified in the subscriber record stored in the system subscriber database (12) and announces (17) that an emergency call was placed from the subscriber's telephone (1).

The remote system computer includes one or more interactive voice response systems (15) based on the level of traffic that it processes. It also includes a network computer (13) connected to a local area network, which interfaces the interactive voice response systems and the system subscriber database (12). The system subscriber data-base is used for the storage of subscriber records, such as billing information and records forming the subscriber's subscription. An example of a subscriber record is shown in FIG. 7, in which a subscriber record includes the subscriber's telephone number, account status, a list of subscriber-supplied notify number(s), optional subscriber-supplied internet addresses, an information line associated with each notify number supplied by the emergency call notify service, a language choice, a call-later tag and a security code.

Overview of the Operation

Figure 2:
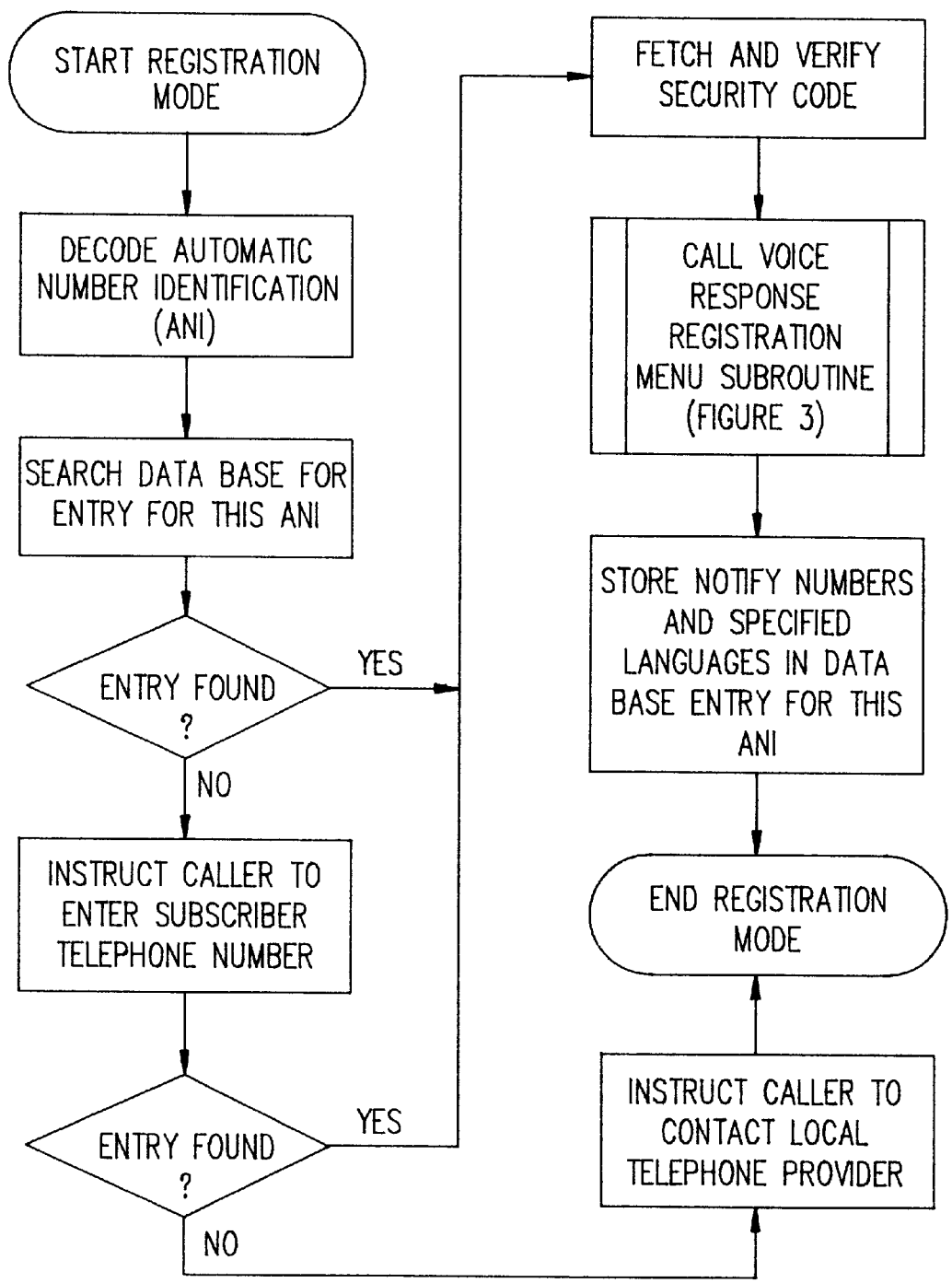
FIGS. 2 through 5 illustrate in flow chart form the principles of the computer programs that implement the present invention; and, FIG. 6 illustrates an example of a subscriber record, which is stored as an entry in a database.

Refer to FIG. 2, which illustrates the basic principles of the registration portion of the system in flow chart form. A new subscriber contacts their local telephone provider and registers for the new notification system. The new subscriber is provided with a password by the local telephone provider and instructed to contact the service provider's registration line to access the system and register the new subscriber's notify number(s). This portion is not depicted as the local telephone provider shall dictate this process.

When a call is received to the new system's registration line, the software decodes the automatic number identification (ANI). Next, the software searches the database for an entry for this ANI. If an entry is found, then the caller is calling from a number that is previously registered with their local telephone provider. The system continues with verification of the subscriber's password. If an entry is not found the system informs the user to enter a registered phone number and password or contact their local telephone provider to register with the service.

Figure 3:
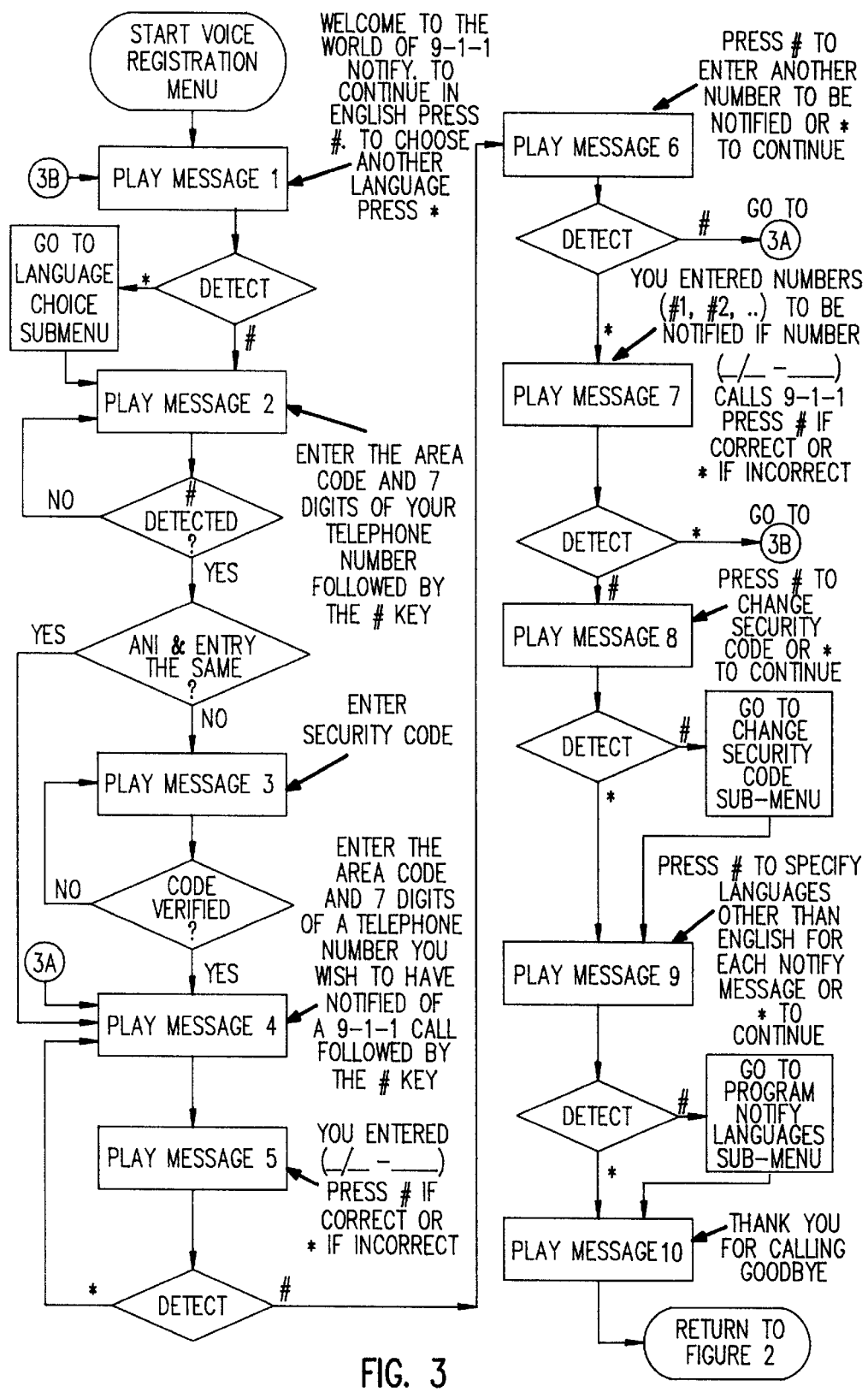

For confirmed subscribers, the software continues with the voice response registration menu subroutine (FIG. 3). After return from the voice response registration menu subroutine, the software stores the notify numbers and specified languages in the System Subscriber Database for this ANI (subscriber). Thereafter, the registration mode ends.

Registration Menu Flow

Refer to FIG. 3, which is a flow chart of the registration process. Interactive Voice Response systems are widely used and are well known to those skilled in the art. The flow charts depict probable scenarios for information purposes of example.

Notification Mode

Figure 4:
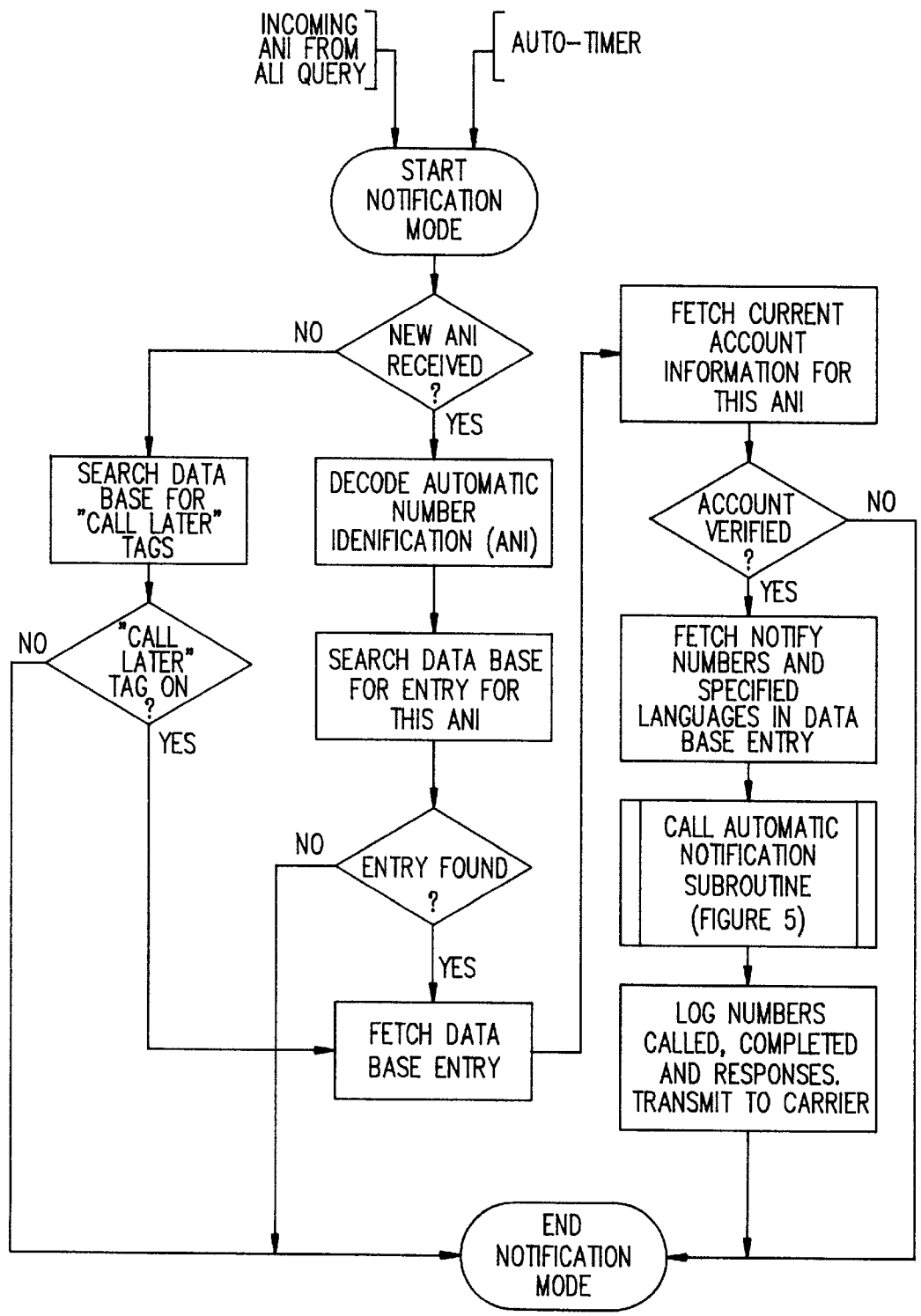

Refer to FIG. 4, which is a flow chart of the notification software. The start notification mode waits for the ANI of a 9-1-1 query to the local telephone provider's ALI via the dedicated connection (FIG. 1, Item 9). When received, the software searches the System Subscriber Database for a matching ANI. If an entry is found, then the software fetches the database entry for this ANI.

Figure 5:
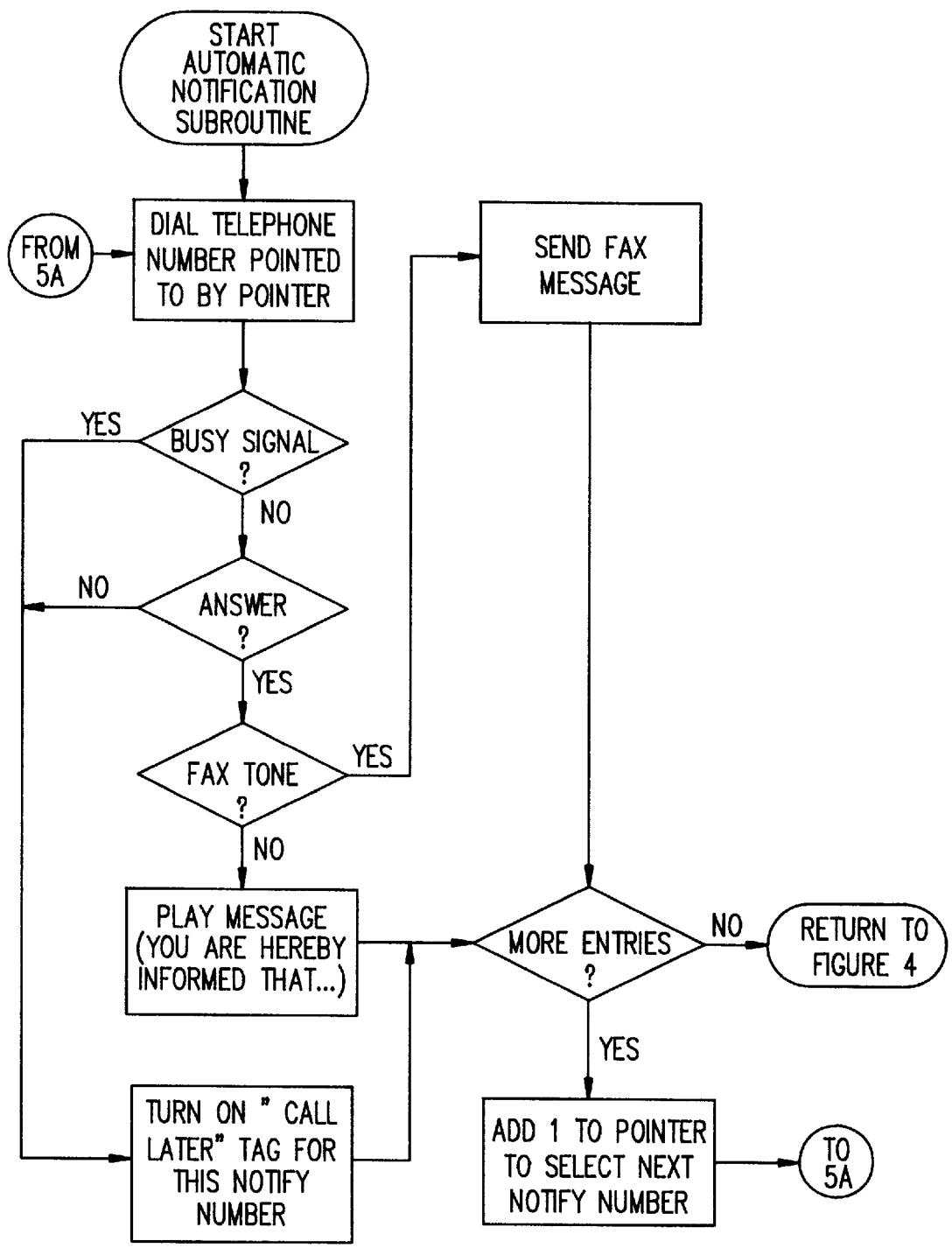

Next, the software fetches the notify numbers and specified languages in the database entry for this ANI. The software calls the automatic notification subroutine (FIG. 5). Upon return from the automatic notification subroutine, the software assembles a log of numbers called, calls completed and responses received. The notification mode ends.

Notification Menu Flow

Refer to FIG. 5, which is a flow chart of the automatic notification software. When the automatic notification subroutine is invoked, it dials the telephone number(s) as predetermined by the subscriber. If the dialed number is answered, and it is not a fax tone, an answering machine, an E-mail address, etc., the software invokes a notification such as: "(Local telephone company) hereby informs you that 9-1-1 was dialed from telephone number (subscriber's telephone number) at (time) on (day)(date). The subscriber is (subscriber 'first name) (subscriber's last name), whose location is (subscriber's location)" or a similar message.

If a fax tone is detected, the software branches to send a fax and sends text that reads "telephone number (subscriber's telephone number) dialed 9-1-1 at (time) on (day) (date). The subscriber is (subscriber's first name) (subscriber 's last name), whose location is (subscriber's location)" or a similar message. Similarly, the software may send an E-mail or post a text message to an Internet site.

If the system detects a busy signal it automatically "tags" the particular notify number and attempts to contact said notify number at a predetermined intervals. This process continues until a number of retries is reached that coincides with the providers setting to "time-out" the attempt.

A check is made for more notify number entries in the database. If no, then the flow ends. If yes, the system repeats the above procedure until all notify numbers are acted on. Once all the subscriber's notify numbers are acted on the process ends. As shown in FIG. 4, the software routinely searches the database via an auto-timer for "call-later" tags that are set to ON and tries again to successfully complete the notification process.

Refer to FIG. 6 which illustrates an example of a subscriber record, which is stored as an entry in a database stored in the system subsrciber database (12) shown in FIG. 1. The subscriber record includes the subscriber's telephone number, a list of subscriber-supplied notify number(s), and one or more of the subscriber's name and address, an account status, subscriber-supplied Internet addresses, an information line associated with a Public Safety Answering Point (PSAP) servicing the subscriber's telephone number, a language choice, a call later tag and a security code. A software pointer selects a record based on a match between a search argument (such as subscriber number, call later tag, etc.) and an entry in one of the corresponding fields of the record.

Summary

What has been described is a new telephone service apparatus and method within a telephone system which provides notification to identified parties that a call to an emergency service has been made from a subscriber number. The subscriber number is identifiable by an Automatic Number Identification (ANI) and the emergency service includes an Automatic Location Identification (ALI) database.

The method involves receiving a query ANI of a call placed to the emergency service, the query ANI corresponding to a query made to the ALI database and using the query ANI to fetch a subscriber record containing indicia corresponding to the identified parties from a subscriber database, and then activating a message response system in response to the indicia to thereby initiate notification to the identified parties that a call to the emergency service has been made from a subscriber number identified by the query ANI.

According to an aspect of the invention, subscriber data packets are created from subscriber data collected from subscribers as part of the telephone service, for example by the telephone company (4). Each of the subscriber data packets includes a subscriber Automatic Number Identification (ANI). A number of subscriber data packets are periodically transferred to the subscriber database (12). At the subscriber database, a number of subscriber data records corresponding to each the subscriber ANI are created. As part of a particular subscriber data record are stored a particular ANI, and indicia, such as a particular address of an addressable notify device supplied by a particular subscriber. The particular subscriber data record is subsequently fetched from the subscriber database memory by computer (13) upon a condition that the particular subscriber ANI in the particular subscriber data record matches the query ANI (9). The computer (13) utilizes the address of the particular addressable notify device, obtained from the particular subscriber data record, to activate the message response system (15) to thereby place a telephone call to the particular addressable notify device.

The emergency service system may include a Public Safety Answering Point (PSAP-5) connected to the Automatic Location Identification (ALI) database (8). In this configuration, the query ANI may be generated from the PSAP over a data path (6) between the PSAP and the ALI database (8) in response to a 9-1-1 call placed to the PSAP. The query ANI may as well come from the selective router (3) as the ANI enters the PSAP or may come from a signal control point or any other source.

The subscriber record (FIG. 6) may include the subscriber's telephone number, a list of subscriber-supplied notify number(s), the subscriber's name and location, an account status, subscriber-supplied Internet addresses, an information line associated with a Public Safety Answering Point (PSAP) servicing the subscriber's telephone number, a language choice, a call later tag and a security code.

The computer (13) may receive over line (9), in addition to the query ANI, associated data, such as subscriber name and subscriber location from the ALI database. In this case, the computer may compose a notify message comprised of a calling phone number derived from the query ANI and additional information derived from data sources including the associated data from the ALI database and other data sources available to the computer, such as time of day, date, etc.

The computer (13) includes a process capable of interacting with the IVR (15) and the subscriber database (12) such that a subscriber record may be fetched by the process from the subscriber database in response to receipt of an ANI from the ALI database that matches an ANI stored in the subscriber database. The process causes a notify message (voice, analog, digital, text, etc.) to be sent to notify numbers stored in the record. The process in the computer may receive in addition to the Automatic Number Identification (ANI) of a caller to a emergency service the number of a Public Service Answering Point (PSAP) to which the emergency call was routed. A storage element in the subscriber record (FIG. 6) in which an ANI of the number of the PSAP to which the emergency call was routed is stored. With this information, the process presents an option to an answering notified party of placing a call to an information telephone station, the ANI of which is stored in the subscriber record as the additional information. The notified party may be transferred to the information number.

The invention has been described with reference to the use of telephone devices and the identification of a caller and a notified called station as using telephone devices. It will be understood by those skilled in the art that other devices may be employed to practice the invention. The invention provides notification upon the event that a 9-1-1 call has triggered a query to a local telephone company's Automatic Location Identification (ALI).

The invention has been described with reference to Interactive Voice Response (IVR) systems in the registration and notification modes. It will be understood by those skilled in the art that the exact content of said messages may vary from that as stated herein.

The invention has been described with reference to the current non-toll telephone number 9-1-1 designated for calls relating to emergencies that threaten human life or property. It shall be understood by those skilled in the art that the invention can be used with other telephone numbers designated for precise purposes. Examples are the proposed 3-1-1 number for non emergencies in the United States and the 0-6-6 number proposed for emergencies in the country of Mexico.

The term and concept "telephone number" is not intended to be limited to an actual telephone set in the conventional sense. It will be understood that the telephone number or caller ID Automatic Number Identification (ANI) in use today may be replaced by any manifestation that identifies the origination point of a call. With the current blurring of the distinction between televisions, Internet-connected computers, cell phones, pagers, facsimile, etc., there will probably be a more universal ID such as a "Personal Information Address" in use. This Personal Information Address could represent one's phone number, Internet address, etc or other information-transfer device. For purposes of the present invention, the information-transfer device from which the subscription is entered, and the information-transfer device to which the notification that a 9-1-1 call has queried an ALI database system response can be any addressable communication device that can be identified by a unique address.

For example, in the drawings, the notified party is shown as a telephone, whereas it will be understood that any information transfer device will suffice (pager, cell phone, computer, Internet TV, etc.) Also, the registration process is shown as occurring from a telephone, whereas it could come from another medium such as over the Internet or filling out a mail in registration card wherein a clerk enters the information.

By way of another example, as Internet communication and telephony become more popular, the present invention can be practiced there as well. The subscription process can occur over the Internet, the recognition that an Internet telephone 9-1-1 call has occurred can be ascertained, and the delivery of the notification message to an Internet phone or other addressable information device can take place.

While the invention has been particularly shown and described with reference to preferred embodiments thereof, it will be understood by those skilled in the art that the foregoing and other changes in form and detail may be made therein without departing from the scope of the invention.

What is claimed is:

1. A telephone service method within a telephone system which provides notification to identified parties that a call to an emergency service has been made from a subscriber number identifiable by an Automatic Number Identification (ANI), said emergency service including an Automatic Location Identification (ALI) database, the improvement characterized by:

receiving a query ANI of a call placed to said emergency service, said query ANI corresponding to a query made to said ALI database;

using said query ANI to fetch a subscriber record containing indicia corresponding to said identified parties from a subscriber database; and, activating a message response system in response to said indicia to thereby initiate notification to said identified parties that a call to said emergency service has been made from a subscriber number identified by said query ANI.

2. The method in accordance with claim 1 further characterized by:

creating subscriber data packets from subscriber data collected from subscribers as part of said telephone service;

each of said subscriber data packets including a subscriber Automatic Number Identification (ANI);

periodically transferring a number of subscriber data packets to said subscriber database;

creating, in said subscriber database, a number of subscriber data records corresponding to each said subscriber ANI;

storing in a particular subscriber data record a particular ANI, and a particular address of an addressable notify device supplied by a particular subscriber;

fetching from said subscriber database memory said particular subscriber data record upon a condition that said particular subscriber ANI in said particular subscriber data record matches said query ANI, and, utilizing said address of said particular addressable notify device, obtained from said particular subscriber data record, to activate said message response system to thereby place a telephone call to said particular addressable notify device.

3. The method in accordance with claim 1 wherein said emergency service system includes a Public Safety Answering Point (PSAP) connected to said Automatic Location Identification (ALI) database, the improvement further characterized by:

generating said query ANI from said PSAP over a data path between said PSAP and said ALI database in response to a call placed to said PSAP.

4. The method in accordance with claim 3 wherein said subscriber record includes the subscriber's telephone number, a list of subscriber-supplied notify number(s), and one or more of the subscriber's name and location, an account status, subscriber-supplied Internet addresses, an information line associated with a Public Safety Answering Point (PSAP) servicing the subscriber's telephone number, a language choice, a call later tag and a security code.

5. The method in accordance with claim 1 further characterized by:

receiving, in addition to said query ANI, associated data from said ALI database;

composing a notify message comprised of a calling phone number derived from said query ANI and additional information derived from data sources including said ALI database.

6. The method in accordance with claim 5 wherein said additional information includes the time, date, subscriber name and subscriber location.

7. The method in accordance with claim 3 further characterized by:

receiving, in addition to said query ANI, associated data from said ALI database;

composing a notify message comprised of a calling phone number derived from said query ANI and additional information derived from data sources including said ALI database.

8. The method in accordance with claim 7 wherein said additional information includes the time, date, subscriber name and subscriber location.

9. In a telephone system in which an Automatic Location Identification (ALI) database of said system receives a query Automatic Location Identification (ANI) of a caller to an emergency service, an apparatus comprising:

a computer connected to said ALI database;

a message response system connected to said computer;

a subscriber database connected to said computer, said subscriber database having a number of subscriber records stored therein;

each subscriber record identifying an associated subscriber's subscription to an emergency call notification feature, a telephone number ANI of said subscriber and subscriber supplied information including one or more telephone numbers to be notified; and, a process in said computer capable of interacting with said IVR and said subscriber database, a subscriber record being fetched by said process from said subscriber database in response to receipt of an ANI from said ALI database that matches an ANI stored in said subscriber database;

a notify message being sent by said IVR, in response to said process, to notify numbers stored in said one record, said notify message comprised of said calling phone number and additional information supplied by said computer independent of said subscriber supplied information.

10. The apparatus in accordance with claim 9 wherein said additional information includes the time, date, subscriber name and subscriber location of said call.

11. The apparatus in accordance with claim 9 wherein said process in said computer receives in addition to the Automatic Number Identification (ANI) of a caller to a emergency service the number of a Public Service Answering Point (PSAP) to which the emergency call was routed, said apparatus further comprising:

a storage element in said subscriber record in which an ANI of the number of the PSAP to which the emergency call was routed is stored; and, wherein said process presents an option to an answering notified party of placing a call to an information telephone station, the ANI of which being stored in said subscriber record as said additional information.

12. The apparatus in accordance with claim 9 wherein said subscriber record includes the subscriber's telephone number, a list of subscriber-supplied notify number(s), and one or more of the subscriber's name and location, an account status, subscriber-supplied Internet addresses, an information line associated with the Public Safety Answering Point (PSAP) servicing the subscriber's telephone number, a language choice, a call later tag and a security code.

13. The method in accordance with claim 5 wherein said associated data from said ALI includes the number of a Public Service Answering Point (PSAP) to which the emergency call was routed, presenting to an answering notified party an option of placing a call to an information telephone station, the ANI of which being stored in said subscriber record as said additional information; and, placing a call to the information telephone station using said ANI obtained from said subscriber record, upon a condition that a notified party invokes said option; and, transferring said notified party to said information number.

14. The method in accordance with claim 11 wherein; responsive to a notified party invoking said option, a call being placed to the information telephone station using said ANI obtained from said subscriber record, and said notified party being transferred to said information number.

15. A telephone service apparatus within a telephone system in which an automatic message response system provides notification to identified parties that a call to an emergency service has been made from a subscriber number identifiable by an Automatic Number Identification (ANI), said emergency service including an Automatic Location Identification (ALI) database, the improvement characterized by:

a computer having stored therein a query ANI of a call placed to said emergency service, said query ANI corresponding to a query made to said ALI database;

a subscriber database connected to said computer, said subscriber database having stored therein a subscriber record containing indicia corresponding to said identified parties;

said subscriber record being fetched to said computer from said subscriber database in response to said query ANI; and, a message response system connected to said computer, said message response system being activated in response to said indicia to thereby initiate notification to said identified parties that a call to said emergency service has been made from a subscriber number identified by said query ANI.

16. The apparatus in accordance with claim 15 further characterized by:

said subscriber database having stored therein subscriber data packets containing subscriber data collected from subscribers as part of said telephone service;

each of said subscriber data packets including a subscriber Automatic Number Identification (ANI);

said subscriber database containing a number of subscriber data records corresponding to each said subscriber ANI;

a particular subscriber data record having stored therein a particular ANI, and a particular address of an addressable notify device supplied by a particular subscriber;

said computer having stored therein a particular subscriber data record fetched from said subscriber database memory upon a condition that said particular subscriber ANI in said particular subscriber data record matches said query ANI; and, said indicia being said address of said particular addressable notify device, obtained from said particular subscriber data record.

17. The apparatus in accordance with claim 15 wherein said emergency service system includes a Public Safety Answering Point (PSAP) connected to said Automatic Location Identification (ALI) database, the improvement further characterized by:

a data path between said PSAP and said ALI database;

said query ANI being transferred from said PSAP over said data path between said PSAP and said ALI database in response to a call placed to said PSAP.

18. The apparatus in accordance with claim 17 wherein said subscriber record includes the subscriber's telephone number, a list of subscriber-supplied notify number(s), and one or more of the subscriber's name and location, an account status, subscriber-supplied Internet addresses, an information line associated with a Public Safety Answering Point (PSAP) servicing the subscriber's telephone number, a language choice, a call later tag and a security code.

19. The apparatus in accordance with claim 15 further characterized by:

said computer having stored therein, in addition to said query ANI, associated data received from said ALI database;

said notify message comprised of a calling phone number derived from said query ANI and additional information derived from data sources including said ALI database.

20. The apparatus in accordance with claim 19 wherein said additional information includes the time, date, subscriber name and subscriber location.

21. The apparatus in accordance with claim 17 further characterized by:

said computer having stored therein, in addition to said query ANI, associated data received from said ALI database;

said notify message comprised of a calling phone number derived from said query ANI and additional information derived from data sources including said ALI database.

22. The apparatus in accordance with claim 21 wherein said additional information includes the time, date, subscriber name and subscriber location.

* * * * *